US012663018B2

(12) United States Patent
Nobel

(10) Patent No.: US 12,663,018 B2
(45) Date of Patent: Jun. 23, 2026

(54) HYBRID MANUFACTURE OF AN IMPELLER

(71) Applicant: KSB SE & Co. KGaA, Frankenthal (DE)

(72) Inventor: Tammuz Nobel, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 0 days.

(21) Appl. No.: 18/280,815

(22) PCT Filed: Mar. 4, 2022

(86) PCT No.: PCT/EP2022/055541
§ 371 (c)(1),
(2) Date: Sep. 7, 2023

(87) PCT Pub. No.: WO2022/189289
PCT Pub. Date: Sep. 15, 2022

(65) Prior Publication Data

US 2024/0151243 A1 May 9, 2024

(30) Foreign Application Priority Data

Mar. 9, 2021 (DE) ..................... 10 2021 105 624.1

(51) Int. Cl.
*F04D 29/44* (2006.01)
*F04D 29/62* (2006.01)

(52) U.S. Cl.
CPC ......... *F04D 29/444* (2013.01); *F04D 29/624* (2013.01); *F05D 2230/232* (2013.01)

(58) Field of Classification Search
CPC ...... F04D 17/122; F04D 29/44; F04D 29/444; F04D 29/445; F04D 29/448;
(Continued)

(56) References Cited

U.S. PATENT DOCUMENTS 5,320,489 A * 6/1994 McKenna ............. F04D 29/448 415/199.1
6,471,475 B1 * 10/2002 Sasu ..................... F04D 29/444 415/211.2
(Continued)

FOREIGN PATENT DOCUMENTS

CN 104533838 A 4/2015
CN 107208653 A 9/2017
(Continued)

OTHER PUBLICATIONS

"Diffuser defintion", Tony Atkins and Marcel Escudier A Dictionary of Mechanical Engineering (1 ed.), 2013 Oxford University Press, eISBN: 9780191752308 (Year: 2013).*
(Continued)

*Primary Examiner* — Courtney D Heinle
*Assistant Examiner* — Ryan C Clark
(74) *Attorney, Agent, or Firm* — Crowell & Moring LLP

(57) ABSTRACT

A centrifugal pump includes at least one impeller. Downstream of the impeller there is arranged a guide device. The guide device is a hybrid component that includes at least one conventionally manufactured constituent and at least one generatively manufactured constituent.

15 Claims, 2 Drawing Sheets

(58) Field of Classification Search
CPC ...... F04D 29/642; F04D 29/62; F04D 29/628; F05D 2230/31; F05D 2230/232; F05D 2230/50; F05D 2230/51
See application file for complete search history.

(56) References Cited

U.S. PATENT DOCUMENTS

| | | | | | |
|---|---|---|---|---|---|
| 6,554,569 | B2 * | 4/2003 | Decker | F04D 29/544 415/914 |
| 6,877,951 | B1 * | 4/2005 | Awdalla | F01D 1/06 415/120 |
| 7,442,006 | B2 * | 10/2008 | Nguyen | F04D 29/624 29/889.22 |
| 8,267,645 | B2 * | 9/2012 | Brunner | F04D 13/10 416/198 A |
| 8,540,484 | B2 * | 9/2013 | Hollman | F04D 29/444 415/208.4 |
| 9,976,568 | B2 * | 5/2018 | Merritt | F04D 29/444 |
| 2007/0065278 | A1 * | 3/2007 | Awdalla | F04D 29/44 415/199.2 |
| 2014/0161624 | A1 | 6/2014 | Bayer et al. | |
| 2017/0030377 | A1 | 2/2017 | Huth et al. | |
| 2017/0102005 | A1 * | 4/2017 | Schuldt | F02B 33/40 |
| 2017/0191480 | A1 * | 7/2017 | Lagas | F04D 29/043 |
| 2017/0218969 | A1 | 8/2017 | Boehm et al. | |
| 2018/0142700 | A1 * | 5/2018 | Hub | F04D 29/626 |
| 2018/0238332 | A1 * | 8/2018 | Ripa | F04D 29/448 |
| 2018/0274376 | A1 * | 9/2018 | King | B22F 5/10 |
| 2019/0022753 | A1 | 1/2019 | Burbaum et al. | |
| 2019/0313878 | A1 | 10/2019 | Dries | |

FOREIGN PATENT DOCUMENTS

| | | | | | |
|---|---|---|---|---|---|
| CN | 109661510 | A | | 4/2019 | |
| DE | 39 12 279 | C2 | | 1/1991 | |
| DE | 10 2011 086 775 | A1 | | 1/2013 | |
| DE | 10 2014 215 089 | A1 | | 2/2016 | |
| DE | 10 2016 201 838 | A1 | | 8/2017 | |
| DE | 10 2016 205 976 | A1 | | 10/2017 | |
| DE | 10 2016 015 359 | A1 | | 6/2018 | |
| DE | 10 2018 218 989 | A1 | | 5/2020 | |
| EP | 2669042 | A1 | * | 12/2013 | B23K 26/342 |
| KR | 2016132594 | A | * | 11/2016 | F04D 17/08 |
| WO | WO-2020094462 | A1 | * | 5/2020 | |

OTHER PUBLICATIONS

International Search Report (PCT/ISA/210) issued in PCT Application No. PCT/EP2022/055541 dated Jun. 27, 2022 with English translation (5 pages).
German-language Written Opinion (PCT/ISA/237) issued in PCT Application No. PCT/EP2022/055541 dated Jun. 27, 2022 with English translation (11 pages).
German-language Search Report issued in German Application No. 10 2021 105 624.1 dated Apr. 4, 2022 with partial English translation (11 pages).
Chinese Office Action issued in Chinese Application No. 202280020194.4 dated Apr. 7, 2026 with English translation only (12 pages).

* cited by examiner

HYBRID MANUFACTURE OF AN IMPELLER

CROSS REFERENCE TO RELATED APPLICATIONS

This application claims priority under 35 U.S.C. § 119 from German Patent Application No. 102021105624.1, filed Mar. 9, 2021, the entire disclosure of which is herein expressly incorporated by reference.

BACKGROUND

The disclosure relates to a centrifugal pump having at least one impeller downstream of which there is arranged a guide device.

Pumps are described as multi-stage when a plurality of impellers are arranged one after the other and the delivery stream flows through the impellers in series. Boiler feed pump is another name for the feed pump and a multi-stage radial pump. The purpose thereof is to feed a steam generator such as a boiler or nuclear reactor with a quantity of feed water corresponding to the quantity of steam emitted.

A barrel casing pump, in power plant technology the feed pumps are also referred to as barrel-type pumps or barrel casing pumps, is a centrifugal pump which is surrounded by a barrel-like casing. The barrel, which is provided with a suction nozzle and a discharge nozzle, is bolted at the end faces to a discharge cover and an inlet ring. The drive shaft passes through the cover on the discharge side and through the inlet ring on the suction side and is sealed in each case by means of a shaft seal. The barrel casing can thus remain connected to the piping and the pump foundation when the pump is dismantled. In the case of a super-pressure pump, the barrel casing is often also welded in the pipeline. Barrel casing pumps are multi-stage pumps of horizontal construction. They are used as super-pressure and high-pressure pumps, in particular as boiler feed pumps.

In multi-stage centrifugal pumps, a guide device is conventionally arranged between two impellers. Guide devices mostly have guide vanes and form guide channels for the pumped medium between two guide vanes. Such guide devices can be in the form of guide wheels. Pumped medium leaving the impeller enters the guide device. In the guide device, kinetic energy is converted into pressure energy. A deflection of the medium further takes place. The swirl is optionally reduced for an approach flow to a further pump stage.

DE 39 12 279 C2 describes a centrifugal pump of the single- or multi-stage type having at least one impeller. A guide wheel is arranged downstream of the impeller in the flow direction. The guide wheel has a plurality of guide vanes.

The impellers and in particular the guide devices are distinguished by a solid construction which is not very filigree, which in most cases is produced by reshaping processes and primary shaping processes. An increase in the efficiency of the pump is mostly limited by the solid form of the guide devices, which is not very optimized in terms of flow. In particular when used continuously as a boiler feed pump, small increases in the efficiency have a major economic impact.

SUMMARY

The object of the disclosure is to provide a centrifugal pump, also a multi-stage centrifugal pump, having optimized flow guidance. The centrifugal pump is to have the highest possible efficiency. Flow separation is largely to be prevented, and retardation with the lowest possible losses is to be ensured. The centrifugal pump is to be able to be individually configured to customers' requirements. This centrifugal pump is to consist of as few individual parts as possible and is to be as easy as possible to assemble. The substitution of replacement parts is to be facilitated by the construction of the centrifugal pump. The centrifugal pump is to be able to be produced simply and inexpensively.

This object is achieved according to the disclosure by a centrifugal pump having at least one impeller. Preferred variants are to be found in the dependent claims, the description and the drawings.

According to the disclosure, a guide device of a centrifugal pump is constructed as a hybrid component comprising at least one conventionally manufactured constituent and at least one generatively manufactured constituent.

A generatively manufactured constituent has been produced by a generative manufacturing process. The term generative manufacturing process includes all manufacturing processes in which material is applied layer by layer and three-dimensional components are thus produced. The layer-wise buildup takes place under computer control from one or more liquid or solid materials according to predefined dimensions and shapes. Physical or chemical curing or melting processes take place during the buildup. Typical materials for 3D printing are plastics materials, synthetic resins, ceramics, metals, carbon materials and graphite materials.

Generative or additive manufacturing processes are understood as being processes in which material is applied layer by layer in order to produce a three-dimensional component. According to the disclosure, at least one guide element of the guide device is in the form of a generatively manufactured constituent. The guide elements are formed in particular using selective laser melting and cladding, which is also known as buildup welding. In an alternative variant of the disclosure, a process which can also be used is cold gas spraying and extrusion in combination with the application of meltable plastics material.

Advantageously, generatively manufactured guide elements are particularly filigree and thin-walled. Fine webs flow-optimized by means of CFD guide the flow of the preceding impeller virtually without losses to the following impeller. The complex structure of the guide element prevents vortex buildup and flow separation and is distinguished by a low component mass.

In selective laser melting, the guide element is produced by a process in which a layer of a buildup material is first applied to a substrate. The buildup material for producing the guide element of the guide device is preferably metallic powder particles. In a variant of the disclosure, iron-containing and/or cobalt-containing powder particles are used for this purpose. These can contain additives such as chromium, molybdenum or nickel. The metallic buildup material is applied in powder form in a thin layer to a plate. The powdered material is then locally melted completely at the desired locations by means of radiation and, after solidification, a solid material layer forms. The substrate is then lowered by the amount of a layer thickness and powder is applied again. This cycle is repeated until all the layers have been produced and the finished guide element has been formed. According to the disclosure, a structure is here produced which is particularly filigree and optimized in terms of flow and which technically cannot be produced by conventional processes.

There can be used as the radiation, for example, a laser beam which generates the guide element from the individual powder layers. The data for guiding the laser beam are generated by means of software on the basis of a 3D CAD body. Alternatively to selective laser melting, an electron beam (EBN) can also be used.

In buildup welding or cladding, the guide element is produced by a process which coats a base structure by welding. By means of a filler metal in the form of a wire or a powder, buildup welding constructs a volume which produces a form of the guide element which is particularly filigree and optimized in terms of flow.

For the use of multi-section high-pressure centrifugal pumps and boiler feed pumps, it has hitherto not been possible to use generatively manufactured guide devices because their dimensions were technically not achievable or achievable only with difficulty. Generatively manufactured constituents of the guide devices are distinguished by hydraulically optimized geometries, which cannot be achieved by cutting or casting manufacturing processes. The formation of a hybrid guide device by means of a plurality of generatively manufactured guide elements which are fitted to conventionally manufactured constituents permits on the one hand a hydraulically optimized geometry and on the other hand component sizes which exceed the known manufacturing dimensions that are possible by generative methods.

According to the disclosure, the guide device has more than two, preferably more than three, in particular more than four, and/or less than twenty, preferably less than eighteen, in particular less than sixteen, guide elements. Advantageously, a hybrid guide device which consists of a plurality of generatively manufactured and hydraulically optimized guide elements can thus be generated. The component size of a guide element can be produced by the common generative processes with all their advantages and, owing to the hybrid construction with conventional constituents, can also reach very large dimensions.

Advantageously, the generatively manufactured constituent, in particular the guide element, has a radially outwardly curved shape. The guide element with its filigree webs is hydraulically optimized in terms of its shape by CFD and deflects the flow while reducing the swirl without flow separation and without vortex buildup. The radially curved shape of the guide element guides the flow to the next pump stage in a particularly ideal manner.

In a particularly advantageous embodiment of the disclosure, the generatively manufactured constituent, in particular the guide element, has formations for flow guidance. These are shaped portions, webs and rounded portions of the guide element which are of particularly fine form and which optimize the hydraulic efficiency of the pump in a very advantageous manner. They allow the flow to be deflected to the next pump stage and ideally reduce the swirl of the flow.

A guide element here preferably has a first, front shaped portion which, in the form of a receiving vane, receives the impeller discharge, which strikes the guide elements through the gap of the conventionally manufactured double ring. The receiving shaped portion guides the flow in a particularly low-loss manner to a second shaped portion, which together with the round ring of the double ring and an adjacent guide element forms a flow channel. The flow is so deflected by means of the flow channel that it flows in the direction toward the impeller arranged downstream. In so doing, the flow preferably passes a rear shaped portion of the guide element, which has a flow-off vane contour. This flow-off vane contour permits a particularly swirl- and loss-free outflow to the next pump stage of the multi-stage centrifugal pump.

The shaped portions are ideally of particularly filigree form and have particularly finely defined radii of curvature. Preferably, the guide element has reinforcing webs at points which do not influence the flow. The generatively manufactured guide element is thus particularly thin and at the same time extremely robust. A guide element with such finely defined vane contours cannot be produced by means of known conventional manufacturing processes and increases the pump efficiency in a very advantageous manner.

According to the disclosure, the generatively manufactured constituent, in particular the guide element, surrounds a guide ring almost without any gaps. Erroneous flows and efficiency losses are thus avoided. The generative manufacture of the guide elements permits extremely precise and accurate manufacture and thus gap-free fitting to the conventionally manufactured constituents of the hybrid guide device.

Ideally, a generatively manufactured constituent, in particular the guide element, has sealing elements for gap-free connection to a guide ring. The generative manufacturing process permits a finely designed geometry of the guide element, so that, when the hybrid elements of the guide device are brought together, a gap-free connection can be produced, whereby the efficiency of the centrifugal pump can reach the hydraulic optimum.

In an alternative variant of the disclosure, the walls of the guide elements are very thin and the guide elements have an inner lattice structure for increasing their strength. In this advantageous manner, guide elements having a particularly excellent ratio of mass to component volume can be achieved. Specifically in comparison to conventionally manufactured guide devices, the hybrid form of the guide devices has a low mass.

In a particularly advantageous embodiment of the disclosure, the hybrid construction of the guide device requires no additional joining technique. According to the disclosure, the generatively manufactured constituent, in particular the guide element, has elements for engaging into counter-elements. For example, short cylindrical pins can be formed on the guide element, which pins can be inserted into corresponding negatives on the conventional constituent and thus form a stable association. Assembly of the centrifugal pump is thus simplified considerably, because the components of the hybrid guide device can simply be fitted together.

Ideally, the elements for engagement are in the form of pins, which are able to engage in a connecting manner into the corresponding counter-elements, which are formed as exact negatives of the pins. The resulting plug-in connection is distinguished by simple assembly and dismantling.

The term conventional constituent denotes a constituent that is produced by means of primary shaping, reshaping or a subtractive manufacturing process. Primary shaping is a main group of manufacturing processes in which a solid body which has a geometrically defined shape is produced from a shapeless material. Primary shaping is used to produce the initial shape of a solid body and to create material cohesion. In the case of reshaping, blanks of plastically deformable materials are purposively brought into a different shape without removing material from the blanks. In the subtractive manufacturing process, some material is removed from the workpiece. In addition to the component that is produced, chips are primarily formed.

According to the disclosure, at least one conventionally manufactured constituent is in the form of a one-piece double ring. Simple rings can be produced particularly economically and precisely by casting. The hybrid construction of the guide device combines components which in each case have been produced in a hydraulically optimized manner by the most advantageous manufacturing process, to form a device which achieves the best possible efficiency of a multi-stage pump.

Advantageously, a conventionally manufactured component comprises a rounded guide ring and a square-edged ring. The rounded guide ring is distinguished by a flow-optimized roundness, on which the guide elements can be arranged in a gap-free manner. The square-edged ring is particularly advantageous for connection to the impeller, which discharges the impeller discharge directly to the radially surrounding guide device.

According to the disclosure, the conventionally manufactured constituent is in the form of a one-piece double ring, the rings of which are connected by at least two connecting webs. The connecting webs achieve a fixed association and arrangement of the rounded guide ring relative to the square-edged ring. At the same time, the gap between the rings has a sufficiently large passage for flow deflection by the guide elements.

Ideally, at least one conventionally manufactured constituent, in particular the guide ring, has counter-elements for the engagement of elements. For example, the counter-elements can be in the form of cylindrical recesses into which the pin-like elements of the guide elements engage and thus achieve the plug-in connection between the guide elements and the guide ring. Assembly of the hybrid guide device can thus be implemented particularly simply and efficiently in terms of time.

In an alternative variant, the generatively manufactured constituents and the conventionally manufactured constituents are joined by a non-releasable connection, preferably a welded connection, to form a guide device. Such a connection is distinguished by its robust and durable form.

In the case of joining, two or more solid bodies, the parts to be joined, having a geometrically defined shape are permanently connected. In the case of welding, a non-releasable connection of the guide elements and the guide ring is produced by the application of heat and/or pressure, with or without filler metals. The filler metals are usually supplied in the form of bars or wires, are melted and solidify in the joint between the join partners in order thus to produce the bond. Welding is one of the substance-to-substance bonding methods, wherein bonds having a high strength are produced.

It is particularly advantageous to manufacture also large, hybrid guide devices by means of an integrative, additive manufacturing process. The one-piece double ring is first formed by primary shaping and/or cutting. The guide elements are produced by means of a generative process. The hybrid guide device is completed by fitting the guide ring to the guide elements.

The buildup material for producing the contact face with the flowing fluid of the guide element is preferably metallic powder particles. In a variant of the disclosure, iron-containing and/or cobalt-containing powder particles are used for this purpose. They can contain additives such as, for example, chromium, molybdenum or nickel.

According to the disclosure, at least one guide element of the guide device is formed in an additive manufacturing process. The 3D form of a guide element is stored in software as a dataset. A robotic arm fitted with tools of different additive processes works at the locations at which the guide element is to be formed and forms, layer by layer, the contact face with the flowing medium and the supporting lattice structure of the contact faces. Advantageously, the suitable buildup process for each buildup material can be carried out for each layer in succession or simultaneously, so that a complex guide element is also formed from different materials, the regions of which are optimally adapted to the requirements of its subsequent use.

In a variant of the disclosure, a lattice structure is produced by means of the melt-layer tool of the additive manufacturing process, in which a grid pattern of points is applied from meltable plastics material to a surface. By extrusion by means of a nozzle and subsequent curing by cooling at the desired position, a load-bearing structure, in particular in the form of a lattice and/or in the form of honeycombs, is produced. Because the supporting region of a guide element is produced so as to form voids and with a particularly high load-bearing capacity, a guide element has considerable strength and at the same time a low mass. A guide element is usually built up in that a working plane is travelled over repeatedly, in each case line by line, and then the working plane is moved upward in a stacking manner, so that the supporting region of a guide element is formed.

In a particularly advantageous variant of the disclosure, the contact face with the flowing fluid of the guide element is produced from a buildup material by successive melting and solidification of layers by means of radiation. The different properties of the regions of a guide element are here generated by variations of the radiation. By purposively controlling the local introduction of heat, a modification of the material properties is effected even during buildup of the guide element. As a result, it is possible to produce, in one region of the guide element, zones and microstructures of different material states of a chemically homogeneous material, and thus different properties.

The metallic buildup material is applied in powder form in a thin layer to a plate. The powdered material is locally melted completely at the desired locations by means of radiation and, after solidification, forms a solid material layer. This base plate is then lowered by the amount of a layer thickness and powder is applied again. This cycle is repeated until all the layers have been produced. Excess powder is cleaned from the finished guide element.

The hybrid construction of the guide device permits guide devices which can be configured particularly individually. Adaptations of the guide device, in particular of the vane-like guide elements. according to the requirements of the centrifugal pump can be taken into consideration by the generative manufacture. Expensive individual manufacture becomes significantly more cost-effective as a result of the comparatively low-cost, hybrid configuration of conventionally and generatively manufactured constituents. In addition, the generatively manufactured constituent can have a shape which can achieve a higher pump efficiency and has hitherto not been achievable by conventional manufacturing methods.

Ideally, the guide device, which is produced in hybrid form from at least one generatively manufactured constituent and at least one conventionally manufactured constituent, is used as the guide device for a centrifugal pump, in particular for a multi-stage high-pressure pump. The guide device is distinguished by excellent fluid-mechanical properties.

Further features and advantages of the disclosure will become apparent from the description of exemplary embodiments with reference to the drawings and from the drawings themselves, in which:

DETAILED DESCRIPTION

Figure 1:
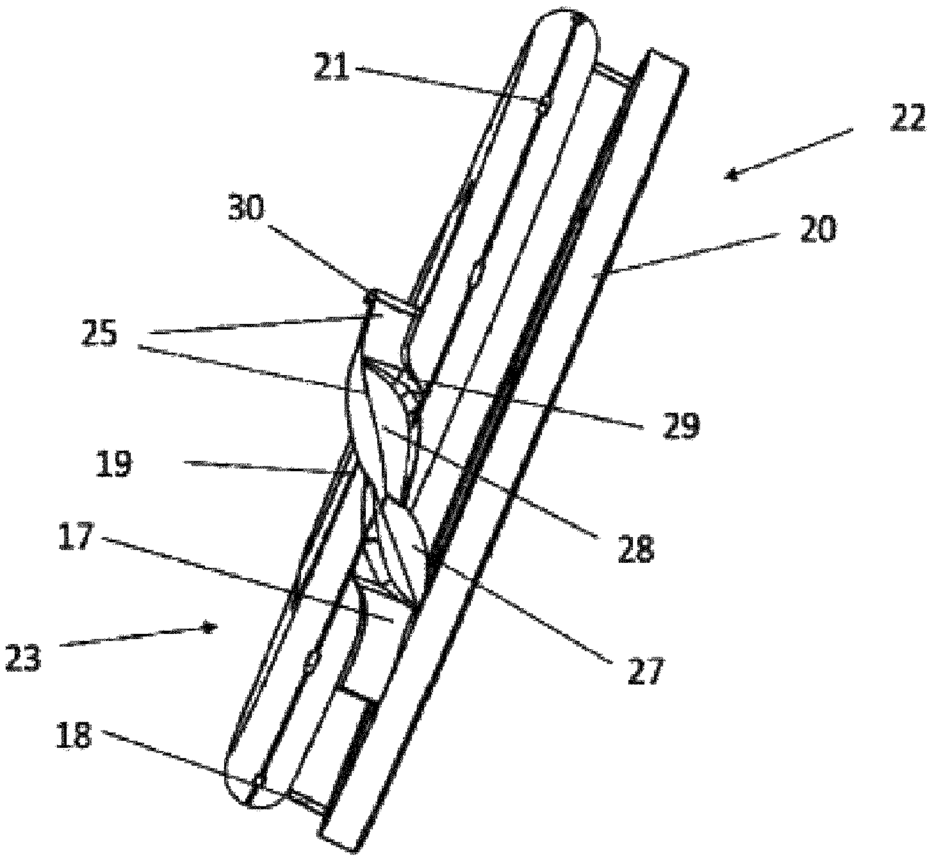
FIG. 1 shows a perspective representation of a guide device.

FIG. 1 shows a perspective representation of the guide device 23 according to the disclosure. The guide device 23 comprises a one-piece double ring 22, which is composed of the rounded guide ring 19, the square-edged ring 20 and the connecting webs 18. The guide ring 19 has counter-elements 21 into which elements 24 (not shown in this figure) engage. Furthermore, in FIG. 1 a guide element 17 is arranged by way of example on the guide ring 19 of the guide device 23. The guide device 23 according to the disclosure comprises more than two, preferably more than three, in particular more than four, and/or less than twenty, preferably less than eighteen, in particular less than sixteen, generatively manufactured guide elements 17.

The square-edged ring 20 radially surrounds an impeller (not shown) and receives the fluid discharge of the impeller. The fluid flow flows through the gap between the rounded guide ring 19 and the square-edged guide ring 20 to the guide elements 17. The guide elements 17 deflect the fluid flow by their radially outwardly curved shape and the formations for flow guidance 25, while reducing the swirl. As a result of their optimized flow shape, the guide elements 17 avoid vortex buildup and flow separations and thus contribute to increasing the efficiency of the centrifugal pump.

The guide device 23 is a hybrid component which is composed of the conventionally manufactured one-piece double ring 22 and the generatively manufactured guide element 17. The hybrid construction of the guide device 23 thus combines the advantages of the respective manufacturing processes in order to achieve the optimum efficiency of the centrifugal pump according to the disclosure.

The guide element 17 preferably has a first, front shaped portion 27 which, in the form of a receiving vane, receives the impeller discharge, which strikes the guide elements 17 through the gap in the conventionally manufactured double ring 22. The receiving shaped portion 27 guides the flow in a particularly loss-free manner to a second shaped portion 28, which together with the round ring 19 of the double ring 22 and the adjacent guide elements 17 forms flow channels. The flow is so deflected by means of the flow channels that it flows in the direction toward the impeller arranged downstream. In so doing, the flow preferably passes a rear shaped portion 30 of the guide element 17, which has a flow-off vane contour. This flow-off vane contour permits a particularly swirl- and loss-free outflow to the next pump stage of the multi-stage centrifugal pump.

In this exemplary embodiment, the formations for flow guidance 25 consist of the front shaped portion 27, the second shaped portion 28 and the rear shaped portion 30. These formations for flow guidance are particularly filigree and have extremely fine radii of curvature. Preferably, the guide element 17 has reinforcing ribs 29 at the connecting points.

Figure 2:
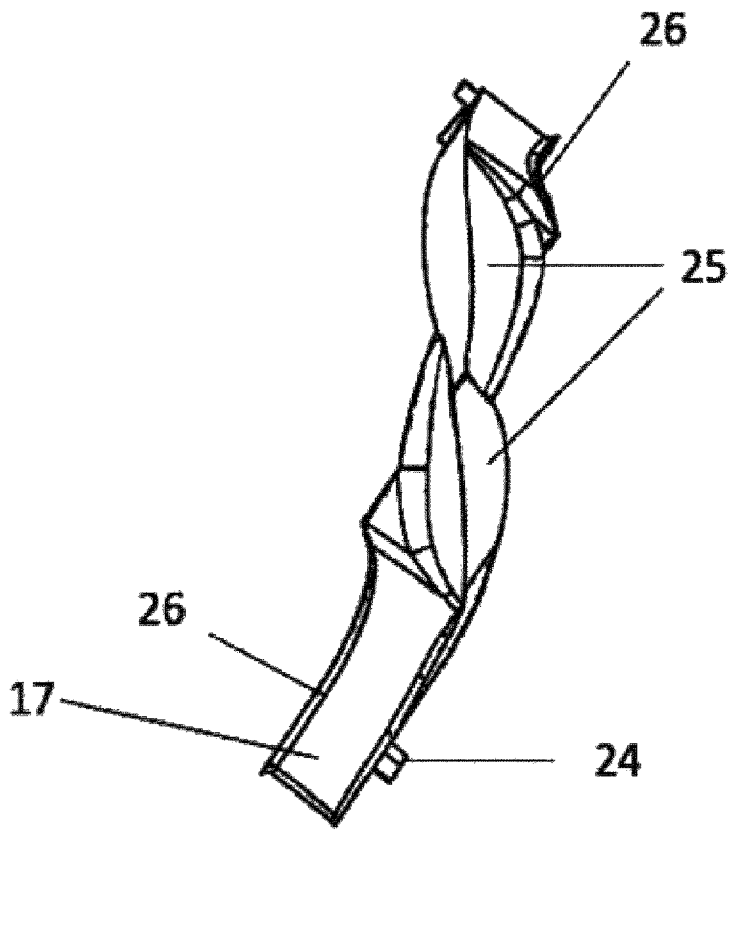
FIG. 2 shows a schematic representation of a guide element.

FIG. 2 shows a schematic representation of the guide element 17, with its radially outwardly curved shape. The generatively manufactured guide element 17 has formations 25 for improved flow guidance, and sealing elements 26 for gap-free connection to the guide ring 19 (not shown). The elements 24 for engaging into the counter-elements 21 (not shown) permit the plug-in design of the guide device 23 of hybrid form.

The foregoing disclosure has been set forth merely to illustrate the disclosure and is not intended to be limiting. Since modifications of the disclosed embodiments incorporating the spirit and substance of the disclosure may occur to persons skilled in the art, the disclosure should be construed to include everything within the scope of the appended claims and equivalents thereof.

The invention claimed is:

1. A centrifugal pump comprising:
a guide device; and
at least one impeller downstream of the guide device, wherein
the guide device is a hybrid component comprising at least one conventionally manufactured constituent having a layer structure formed by casting and at least one generatively manufactured constituent having a multilayer structure,
the at least one generatively manufactured constituent is elements having the multilayer structure and being configured to engage into counter-elements, while a remainder of the guide device, other than the elements has the layer structure formed by casting, wherein
the at least one conventionally manufactured constituent is a one-piece double ring, wherein the one-piece double ring comprises a rounded guide ring and a square-edged ring connected by at least two webs to define a flow gap between the rounded guide ring and the square-edged ring, and
the guide device has front shaped portion which, in the form of a receiving vane, receives an impeller discharge that passes through the flow gap between the rounded guide ring and the square edged ring.

2. The centrifugal pump as claimed in claim 1, wherein the at least one generatively manufactured constituent is a guide element.

3. The centrifugal pump as claimed in claim 2, wherein the guide device has more than two guide elements, and/or less than twenty guide elements.

4. The centrifugal pump as claimed in claim 3, wherein the at least one generatively manufactured constituent has a radially outwardly curved shape.

5. The centrifugal pump as claimed in claim 4, wherein the at least one generatively manufactured constituent has formations configured to guide flow.

6. The centrifugal pump as claimed in claim 5, wherein the formations comprise at least one receiving shaped portion, a channel-forming shaped portion, and a rear shaped portion with a flow-off vane contour.

7. The centrifugal pump as claimed in claim 6, wherein the at least one generatively manufactured constituent surrounds a guide ring without any gaps.

8. The centrifugal pump as claimed in claim 6, wherein the at least one generatively manufactured constituent has sealing elements configured to connect a guide ring in a gap-free manner.

9. The centrifugal pump as claimed in claim 1, wherein the at least one conventionally manufactured constituent has at least two connecting webs configured to connect a guide ring to the square-edged ring.

10. The centrifugal pump as claimed in claim 9, wherein one of the at least one conventionally manufactured constituent has counter-elements configured to engage with elements.

11. The centrifugal pump as claimed in claim 10, wherein one of the at least one generatively manufactured constituent and one of the at least one conventionally manufactured constituent are connected by a non-releasable welded connection.

12. The centrifugal pump as claimed in claim 11, wherein the one of the at least one generatively manufactured constituent and the one of the at least one conventionally manufactured constituent are connected by a releasable plug-in connection.

13. A method comprising:

providing a centrifugal pump having a guide device and at least one impeller positioned downstream of the guide device;

forming the guide device as a hybrid component by:

casting at least one conventionally manufactured constituent having a layer structure formed by casting;

generatively manufacturing at least one additional constituent having a multilayer structure;

assembling the generatively manufactured constituent with the conventionally manufactured constituent such that the generatively manufactured constituent includes elements having the multilayer structure that engage into counter-elements of the conventionally manufactured constituent, while a remainder of the guide device other than the elements comprises the layer structure formed by casting;

constructing the at least one conventionally manufactured constituent as a one-piece double ring by:

forming a rounded guide ring and a square-edged ring; and connecting the rounded guide ring and the square-edged ring by at least two webs to define a flow gap between the rounded guide ring and the square-edged ring;

forming a front-shaped portion on the guide device in the form of a receiving vane configured to receive an impeller discharge passing through the flow gap between the rounded guide ring and the square-edged ring; and operating the centrifugal pump such that the impeller discharges fluid through the flow gap and into the receiving vane of the guide device.

14. The method according to claim 13, wherein the at least one generatively manufactured constituent has elements configured to engage into counter-elements.

15. The centrifugal pump as claimed in claim 1, wherein the at least one generatively manufactured constituent is a guide element having a radially outwardly curved shape, the guide element having formations configured to guide flow, and sealing elements configured to generate a gap-free connection to the guide ring.

* * * * *